(12) United States Patent
Junk et al.

(10) Patent No.: US 7,917,233 B2
(45) Date of Patent: *Mar. 29, 2011

(54) LEAD-LAG FILTER ARRANGEMENT FOR ELECTRO-PNEUMATIC CONTROL LOOPS

(75) Inventors: Kenneth William Junk, Marshalltown, IA (US); Annette L. Latwesen, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/556,036

(22) Filed: Sep. 9, 2009

(65) Prior Publication Data

US 2009/0326682 A1    Dec. 31, 2009

Related U.S. Application Data

(63) Continuation of application No. 10/595,116, filed as application No. PCT/US2005/037810 on Oct. 20, 2005, now Pat. No. 7,593,802.

(60) Provisional application No. 60/620,537, filed on Oct. 20, 2004, provisional application No. 60/652,546, filed on Feb. 14, 2005.

(51) Int. Cl.
 *G06F 19/00* (2006.01)
(52) U.S. Cl. .......................... 700/28; 700/65
(58) Field of Classification Search .......... 700/1, 29–37, 700/55, 71–74, 65, 44–45; 91/24; 137/82; 701/66, 138, 105, 45, 101, 120

See application file for complete search history.

(56) References Cited

U.S. PATENT DOCUMENTS

| | | |
|---|---|---|
| 4,417,312 A | 11/1983 | Cronin et al. |
| 4,489,376 A | 12/1984 | Putman |
| 4,792,902 A | 12/1988 | Hrovat et al. |
| 4,805,126 A | 2/1989 | Rodems |
| 4,808,126 A * | 2/1989 | Wilson ..................... 439/607.18 |
| 5,043,863 A | 8/1991 | Bristol et al. |
| 5,195,028 A | 3/1993 | Hiroi |
| 5,272,647 A | 12/1993 | Hayes |
| 5,394,322 A | 2/1995 | Hansen |
| 5,406,474 A | 4/1995 | Hansen |

(Continued)

FOREIGN PATENT DOCUMENTS

EP    0 869 104 A1    10/1998

(Continued)

OTHER PUBLICATIONS

Instruction Manual, Form 5122, Aug. 2003, Type 2625 and 2625NS Volume Boosters (12 pages).
Jack L. Johnson, P.E., "The Final Word on Non-symmetrical Valves," Hydraulics and Pneumatics, Oct. 2003 (3 pages).

(Continued)

*Primary Examiner* — Kidest Bahta
(74) *Attorney, Agent, or Firm* — Marshall, Gerstein & Borun LLP

(57) ABSTRACT

A lead-lag input filter is connected ahead of a positioner feedback loop having one or more valve accessories, such as a volume booster or a QEV, to overcome slow dynamics experienced by the accessories when receiving low amplitude change control or set point signals. A user interface is connected to the lead-lag input filter and enables an operator or other control personnel to view and change the operating characteristics of the lead-lag input filter to thereby provide the control loop with any of a number of desired response characteristics.

22 Claims, 5 Drawing Sheets

U.S. PATENT DOCUMENTS

| | | | |
|---|---|---|---|
| 5,504,608 | A | 4/1996 | Neeves et al. |
| 5,504,672 | A | 4/1996 | Hardiman et al. |
| 5,511,863 | A | 4/1996 | Suh |
| 5,521,824 | A | 5/1996 | Eagan et al. |
| 5,568,389 | A | 10/1996 | McLaughlin et al. |
| 5,576,976 | A | 11/1996 | White |
| 5,587,896 | A | 12/1996 | Hansen et al. |
| 5,615,593 | A | 4/1997 | Anderson et al. |
| 5,789,987 | A | 8/1998 | Mittel et al. |
| 5,838,561 | A | 11/1998 | Owen |
| 5,951,240 | A | 9/1999 | Mirsky et al. |
| 6,085,940 | A | 7/2000 | Ferri, Jr. |
| 6,108,609 | A | 8/2000 | Qian et al. |
| 6,198,246 | B1 | 3/2001 | Yutkowitz |
| 6,281,650 | B1 | 8/2001 | Yutkowitz |
| 6,330,483 | B1 | 12/2001 | Dailey |
| 6,453,261 | B2 | 9/2002 | Boger et al. |
| 6,466,893 | B1 | 10/2002 | Latwesen et al. |
| 6,760,692 | B1 | 7/2004 | Rose |
| 6,862,199 | B2 | 3/2005 | Escobar et al. |
| 7,349,745 | B2 | 3/2008 | Junk |
| 2002/0040284 | A1 | 4/2002 | Junk |
| 2002/0055790 | A1 | 5/2002 | Havekost |
| 2003/0105535 | A1 | 6/2003 | Rammler |
| 2004/0194101 | A1 | 9/2004 | Glanzer et al. |
| 2006/0012414 | A1 | 1/2006 | Goldman |
| 2006/0118169 | A1 | 6/2006 | Junk |
| 2007/0162214 | A1 | 7/2007 | Junk et al. |

FOREIGN PATENT DOCUMENTS

| | | |
|---|---|---|
| EP | 0 869 204 A1 | 10/1998 |
| JP | 4-000601 A | 1/1992 |
| JP | 7-503082 T | 3/1995 |
| JP | 2000-39901 A | 8/2001 |
| JP | 2002-149207 A | 5/2002 |
| WO | WO-93/09481 A1 | 5/1993 |

OTHER PUBLICATIONS

Rudolph Muijtjens, "Praktisches Positionieren mit pneumatischen Linearantrieben," Olhydraulik und Pneumatik, vol. 42, No. 7, Mainz, DE (1996); ("Practical Positioning with Pneumatic Linear Drives," 3031 Oil Hydraulics and Pneumatics, vol. 42, No. 7) (11 pages).

International Preliminary Report on Patentability for International Application No. PCT/US2005/037810, dated Oct. 20, 2004 (1 page).

"Bridgeview," User Manual, National Instruments, May 1998 (49 pages).

Tewksbury, "Instruments and Measurements Laboratory Facilities LabView Software Tool Suite Capabilities," Feb. 26, 1999 (7 pages).

International Search Report for International Application No. PCT/US05/37810, dated Jul. 10, 2006 (3 pages).

Written Opinion for International Application No. PCT/US05/37810, dated Jul. 10, 2006 (3 pages).

Translation of Chinese Office Action for corresponding Application No. 200580025123.x, dated Sep. 5, 2008 (17 pages).

J.B. Calvert, Electronics 12, "The Phase-Locked Loop" (8 pages), Jul. 22, 2001.

ControlGlobal.com, "Three Alternative Approaches to Better Loop Control", (referenced by Examiner in parent case U.S. Appl. No. 10/595,116) (3 pages), 2004.

ControlGlobal.com, "Three Alternative Approaches to Better Loop Control", (referenced by Examiner in parent case U.S. Appl. No. 10/595,116) (6 pages), 2005.

Translation of Substantive Examination Report from Argentina Patent Application No. P05 01 04380, May 5, 1996, Nov. 19, 1996.

"BridgeVIEW™ and LabVIEW™—PID Control Toolkit for G Reference Manual," National Instrument (Jan. 31, 1998): URL:http://www.ni.com/pdf/manuals/320563b.pdf.

Supplementary European Search Report for Application No. 05814806, dated Jun. 11, 2010.

Notice of Rejection for Japanese Patent Application No. 2007-538048, dated Nov. 16, 2010.

* cited by examiner

LEAD-LAG FILTER ARRANGEMENT FOR ELECTRO-PNEUMATIC CONTROL LOOPS

REFERENCE TO RELATED APPLICATIONS

This disclosure is a Continuation of U.S. patent application Ser. No. 10/595,116, filed Feb. 21, 2006, and issued as U.S. Pat. No. 7,593,802, which was the United States national stage (under 35 U.S.C. §371) of International Application No. PCT/US05/37810, having an international filing date of Oct. 20, 2005, and is entitled to the benefit of the filing date of U.S. Provisional Application Nos. 60/620,537, filed Oct. 20, 2004, and 60/652,546, filed Feb. 14, 2005, as to all subject matter commonly disclosed therein.

FIELD OF THE DISCLOSURE

This disclosure relates generally to the field of servo controllers for use in logical processes or control loops and, more particularly, to the augmentation of electro-pneumatic control loops and other logical processes for improvement of performance of control valves and pneumatic actuator accessories.

BACKGROUND

Electro-pneumatic control systems are increasingly being employed with process control devices, such as valve actuators and piston actuators, in order to provide better or more optimal control of fluid within a process plant. Some such electro-pneumatic control systems include one or more accessories for controlling valve and piston actuators such as volume boosters and quick exhaust valves (QEVs). A volume booster, which is typically coupled to a pneumatic actuator for a valve, increases the rate of air supplied to the pneumatic actuator, or increases the rate of air exhausted from the pneumatic actuator. This increased air movement amplifies the actuator stroke speed, thereby increasing the speed at which the actuator is able to stroke the valve plug toward its open or closed position, and thus enables the valve to respond more quickly to process fluctuations. Similar to volume boosters, QEVs increase the speed at which an actuator is able to stroke a valve toward an open or closed position.

Currently, volume boosters are utilized with pneumatic actuators in a manner that makes the actuators move very slowly in response to very small set point or control signal changes. In particular, some volume boosters are designed with a built-in dead band to actually prevent the volume booster from becoming active in response to small amplitude change control signals. While some volume boosters have small dead bands at the lower amplitude signal range, these volume boosters still move very slowly in response to small amplitude signal changes, becoming fast only in response to larger amplitude input signals.

DETAILED DESCRIPTION OF THE PREFERRED EMBODIMENTS

Generally speaking, a lead-lag input filter is provided ahead of a positioner feedback loop in conjunction with one or more valve accessories, such as a volume booster or a QEV, to overcome slow dynamics experienced by the accessories when receiving low amplitude change control or set point signals. Additionally, a user interface enables an operator or other control personnel to view and change the operating characteristics of the lead-lag input filter to thereby provide the control loop with any of a number of desired response characteristics. Through manipulation of the ratio of lead-to-lag of the lead-lag input filter, a process parameter, such as displacement or travel of a valve stem, may be controlled, and in particular, fine tuned.

Figure 1:
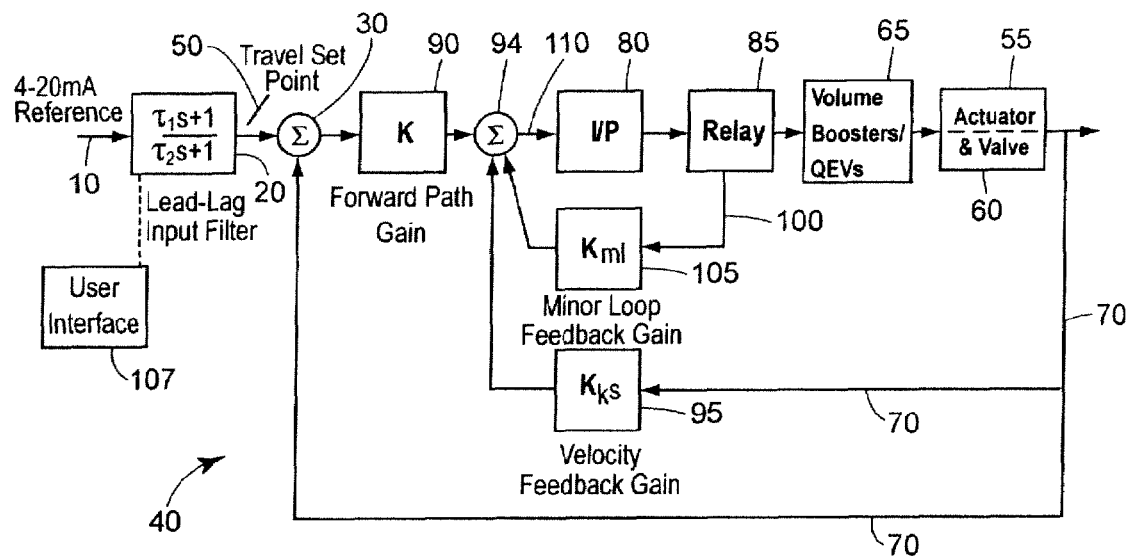
FIG. 1 is a block diagram of an electro-pneumatic control system augmented with a lead-lag input filter.

FIG. 1 illustrates a control loop 40, such as an electro-pneumatic control loop or other logical process, having a lead-lag filter 20 connected to the input thereof. In particular, a reference control signal 10, such as a 4-20 mA set point signal or control signal generated by a process controller or user interface, is applied to the input of the lead-lag input filter 20 which operates on the reference signal (which can be a set point or other control signal) to provide a filtered output 50 (also called a travel set point signal) to a summer 30 associated with the electro-pneumatic control loop 40. As illustrated in FIG. 1, the summer 30 compares the valve travel with the travel set point signal 50 to generate an error signal, which is provided to an amplifier or gain unit 90 (called a forward path gain unit) which applies a gain K. The output of the forward path gain unit 90 is provided to a further summer 94 which sums (in this case, subtracts) a velocity feedback gain developed by a gain unit 95 and a minor loop feedback gain developed by a gain unit 105 from the output of the forward path gain unit 90. The output 110 of the summer 94 is provided to a current-to-pressure (I/P) transducer 80 which develops and provides a pneumatic or pressure signal to a pneumatic relay 85. As illustrated in FIG. 1, a measurement of the relay position 100 is provided to the gain unit 105 and is used to develop the minor loop feedback gain.

The pneumatic output of the relay 85 is provided to the volume booster or QEV 65. This pneumatic signal is used to control the valve actuator of an actuator 55 associated with a valve 60. As illustrated in FIG. 1, the measured valve travel of the valve plug, or the position of the valve stem with which the valve plug is associated, is provided to the summer 30 for comparison to the travel set point signal, as well as to the velocity feedback gain unit 95 to develop the velocity feedback gain. At least one sensor (not shown) is employed to detect the measured valve travel of the valve plug or the position of the valve stem.

Generally speaking, the transfer function and operation of lead-lag input filter 20 is configurable via a user interface 107. In particular, a technician can remotely adjust the travel set point signal 50 for driving the pneumatic actuator 55 and the control valve 60, or other device controlled by the electro-pneumatic control loop 40, by adjusting parameters of the lead-lag filter 20. The user interface 107 may be provided to enable remote monitoring of, control of, or communication with the electro-pneumatic control loop 40 from a remote location or from a location in the immediate vicinity of the control loop 40.

During operation, the lead-lag filter 20 will generally provide a large amplitude, but short duration, spike at the beginning of any step change in the received reference signal 10, which allows the valve 60 to move in smaller steps. Additionally, a fast decay rate (which translates to a small lag time) is provided in the filter response to mitigate overshoot for larger steps.

While a distributed control system (DCS) typically updates at a frequency on the order of 1 Hz or slower, a positioner (within the control loop 40) can update at a frequency of 100 Hz or more. As a result, the response time provided by the lead-lag filter 20 in series with the positioner can be on the order of 100 ms, which is much faster than can be provided by the control dynamics of the DCS alone.

Additionally, the lead-lag filter 20 can provide inherent protection against over driving the valve plug of the valve 60 into the valve seat or into the upper travel stop. In particular, algorithms or control routines can be implemented within or as part of the filter 20 to clip the valve's response near a valve seat or a travel stop, and thereby prevent the lead-lag filter 20 from bouncing the valve plug of the valve 60 off of the valve seat or an upper travel stop.

Figure 2:
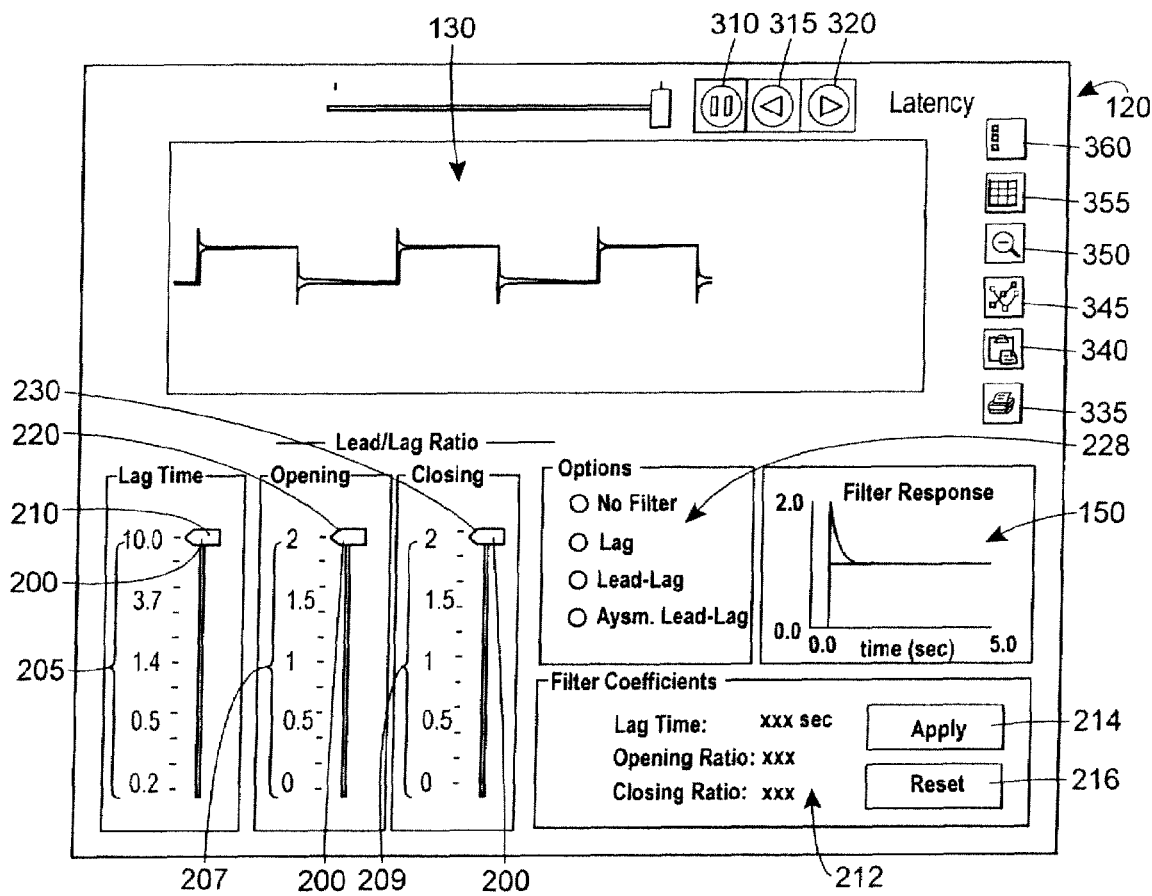
FIG. 2 is an example screen display generated by a user interface routine of an electro-pneumatic control system, such as that shown schematically in FIG. 1, illustrating travel set point plotted against time, and lead-lag filter response plotted against time, when the lead-lag input filter is engaged.
Figure 3:
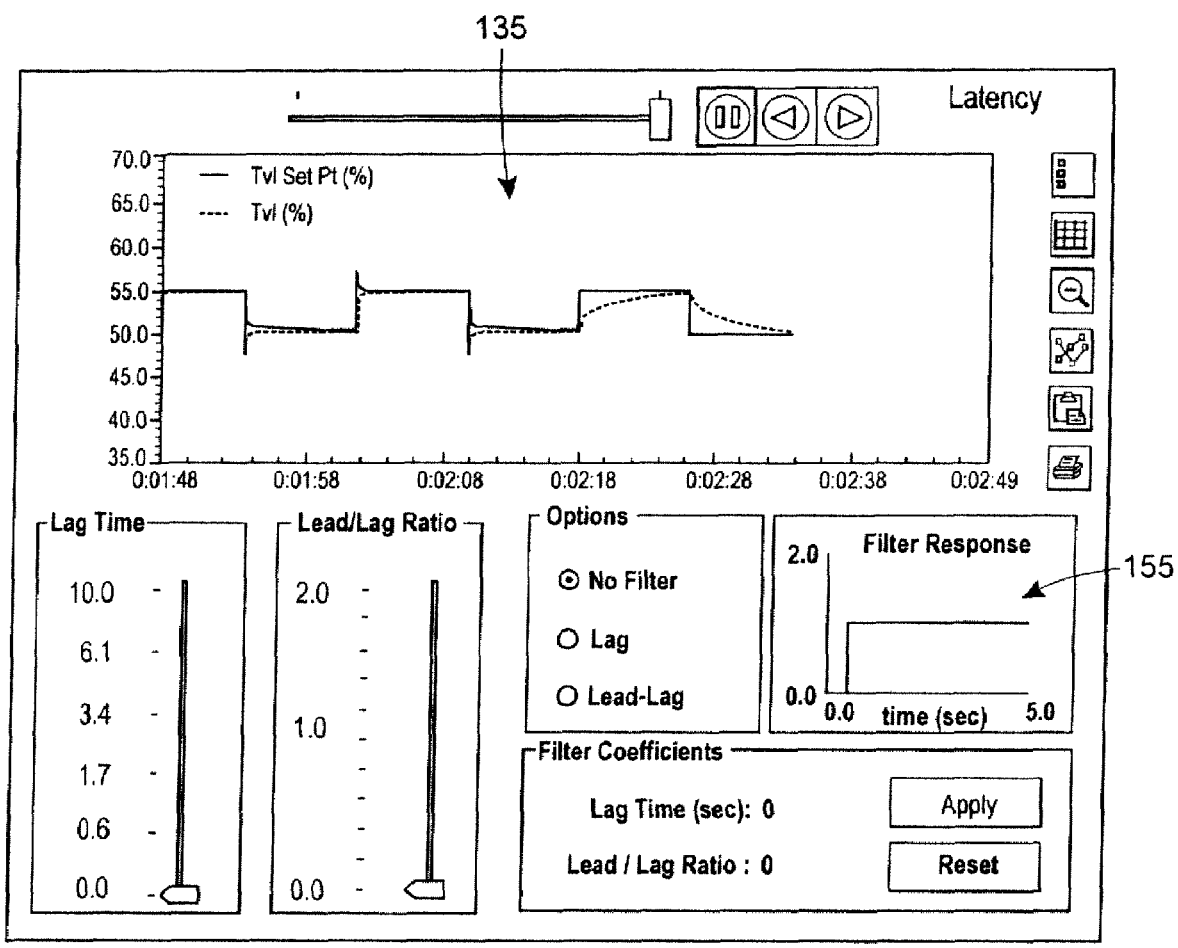
FIG. 3 is an example screen display generated by a user interface routine of an electro-pneumatic control system, such as that shown schematically in FIG. 1, illustrating travel set point plotted against time, and lead-lag filter response plotted against time, when the lead-lag input filter is disengaged.

Still further, as will be understood with respect to FIGS. 2 and 3, the operating characteristics of the lead-lag filter 20 can be easily adjusted using the user interface 107, which may be stored in a computer and operably coupled to the control loop 40 and one or more display screens. Because many processes that use large actuators with complex accessory configurations generally require complicated and highly customized control algorithms to control the process loop, operators are typically reluctant to modify the process controller by adding dynamics within the control routine. Instead, operators generally prefer to effect or change dynamics at the valve level. The lead-lag filter 20, which can be modified to vary the process dynamics at the valve or loop level, provides the operator with just such control.

As illustrated in FIG. 1, the lead-lag input filter 20 is preferably implemented in combination with a user interface 107, such as a computer program with user-friendly, real-time graphics. One or more routines and one or more processors in operable communication with the user interface 107, the lead-lag input filter 20, and one or more devices or components within the control loop 40 may be employed to implement the functionality and features disclosed herein.

The user interface 107 is preferably implemented in communication with a graphical user interface (GUI) to facilitate a user's interaction with the various capabilities provided by the user interface 107 and lead-lag input filter 20. The GUI may include one or more software routines that are implemented using any suitable programming languages and techniques. Further, the software routines making up the GUI may be stored and processed within a single processing station or unit, such as, for example, a workstation, a controller, etc., such as in a control room within a process control plant or a central control room facility for one or a number of geographically remote process control plants, or, alternatively, the software routines of the GUI may be stored and executed in a distributed manner using a plurality of processing units that are communicatively coupled to each other.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the user interface 107 described herein may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the user interface 107 and lead-lag input filter 20.

An example of such a GUI is generally depicted in a display 120 illustrated in FIG. 2. As depicted in FIG. 2, the display 120 graphically depicts the filter output or travel set point signal 50 and the position feedback, utilizing, for example, data collected from the actuator feedback signal 70 or the relay position feedback signal 100. The feedback signals 70, 100 vary proportionally in response to changes in a process parameter with which they are associated, in this case the position of the actuator 55 or the relay 85, so graphically depicting changes in the feedback signals 70, 100 provides an accurate indication of actual variation in valve stem position. Such real-time graphics allows the control valve 60 to be tuned remotely and provides quantifiable results. Additionally, remote tuning of the control valve loop via the user interface 107 significantly reduces maintenance costs by avoiding physical maintenance visits to individual control valves.

A control room with one or more computer terminals for accessing the user interface 107 may be provided in the geographic vicinity of the valves or loops to be controlled. Alternatively, satellite communication, telephone lines, coaxial cable, Ethernet, fiber optic cable connections, an intranet, the Internet, or other long distance communication technology may be employed to provide remote access to the user interface 107 at geographically distant locations. A central control facility may be provided in which one or more computer terminals for accessing the user interfaces 107 associated with valves or loops provided with lead-lag filters 70 in a plurality of locations separated by long distances from the central control facility. As explained in greater detail below, the user interface 107 is provided with a plot allowing the operator or technician to predict or view the filter response when particular settings are selected for various user-adjustable parameters of the lead-lag input filter 20.

While there is inherent delay when signals or data are transmitted via one or a combination of the various communication technologies especially over long distances, the user interface 107 can be employed in a manner to adjust for such delays, provided the extent of the delays are known or can be calculated or determined. For example, the user interface 107 may provide the user or operator with the option of implementing a particular set of adjustments to the user-adjustable parameters of the lead-lag input filter 20 which the user or operator has first plotted using the predicted response capabilities of the user interface 107, discussed in more detail below. If the new set of adjustments is to be implemented for a valve or loop in a distant location at a time selected by the user or operator, the user interface 107 may factor the delay into a calculation of the timing for sending actual signals to the lead-lag input filter 20 of a particular valve or loop. For instance, if the user or operator wants the new set of adjustments to be implemented in 10 seconds, and there is a known or calculated delay of 0.5 second, the actual signal to the lead-lag input filter 20 may be sent in 9.5 seconds. This assumes the user or operator is receiving and displaying in real time the filter output and travel feedback data concerning the actual control valve or control loop to which the lead-lag input filter 20 has been added.

Using a computer software program for the control of parameters associated with a control valve, such as the AMS ValveLink® Software program, available from the Fisher Controls division of Emerson Process Management, the user interface 107 may be configured to display real-time filter output and travel feedback data from the control valve or other device with which the lead-lag input filter 20 is employed. Additional data may also be displayed, such as reference signal to the device. For example, as illustrated in FIG. 2 by the graph 130, the user interface 107 may plot on the GUI the real-time travel set point ("Tvl Set Pt") and travel feedback data ("Tvl"), displayed as percentages (%), against time to enable an operator to easily view the response of the control valve to changes in the reference signal.

The improved control achieved by using the lead-lag filter 20 at low amplitudes can be appreciated by comparing the plot 130, shown in the graphics display 120 shown in FIG. 2, reflecting real-time data for the travel set point 50 and the travel feedback 79 collected while the lead-lag filter 20 is engaged, to the plot 135 shown in the graphics 140 displayed in FIG. 3, reflecting data collected while the lead-lag filter is turned off or disengaged after the 0:02:12 time mark, where the times displayed on the horizontal axis of the plot are in hours, minutes, and seconds. Here, it can be seen that, without the lead-lag filter 20, the response of the valve 60 deteriorates in and slows as a result of a simple step change in the travel set point (reference) signal. Real-time graphics, such as those illustrated in FIGS. 2 and 3, are particularly advantageous for tuning the lead-lag input filter 20, given the sensitivity and complexity associated with the valve dynamics, even at low amplitudes.

Referring again to FIG. 2, for ease of operation, tuning coefficients associated with the lead-lag input filter 20 may be represented in the display 120 of the user interface routine using a filter response plot 150. Additionally, the tuning coefficients (and thereby the transfer function) associated with the lead-lag filter 20 may be changed using one or more virtual interface controls 200, depicted in FIG. 2 as graphical representations of slider bars 210, 220, and 230. A control operator or technician may manipulate the slider bars 210, 220, and 230 using, for example, a computer input device (not shown) such as a mouse, knob, trackball, keyboard, touch-screen monitor, voice-activation, or stylus pad to thereby change the transfer function or dynamics of the lead-lag input filter 20. Of course, this list of computer input devices is intended to be exemplary only, and other input devices may likewise be used to manipulate the sliders 210, 220, and 230. Also, the virtual interface controls 200 may alternatively be graphically represented by, for example, dials (not shown) or other graphics. Additionally, as illustrated in FIG. 2 at the areas 205, 207, 209 to the left of the sliders 210, 220, 230, the filter coefficients or ratios selected by the sliders 210, 220 and 230 may be displayed in numerical form, and buttons 214 and 216, shown in the area designated 212 of the display 120, may be used to apply the current settings or to reset the current setting of the lead-lag filter 20.

Valid values for the lag time filter coefficient 205 include 0.00 (which results in bypassing the filter), and values in a range from 0.10 to 10.00 seconds. Preferably, the range of lag time filter coefficients 205 is shown in a logarithmic scale on the plot 130 of the display 120, inasmuch as most lag time filter coefficients are selected in a range from 0.10 to 2.00 seconds.

Valid values for the lead time to lag time ratio in the opening direction 207, and lead time to lag time ratio in the closing direction 209, range from 0.0 to 2.0, and are shown in a linear scale on the display 120.

As illustrated in FIG. 2, the slider 210 adjusts the lag time, which determines the decay rate of the filter response. The larger the lag time, the slower the lead-lag input filter 20 returns its output to the reference signal 10. The slider 220 of FIG. 2 adjusts the ratio of the lead time to the lag time in the opening direction. The slider 230 of FIG. 2 adjusts the ratio of the lead time to the lag time in the closing direction. This ratio determines the initial response of the lead-lag input filter 20. As indicated above, the lead-lag filter 20 is generally configured to provide a large amplitude, but short duration, spike in the travel set point 50, which allows the valve 60 to move in smaller steps. A fast decay rate (which translates to a small lag time) also mitigates overshoot for larger steps because the valve 60 tends to slew allowing the filter response to decay away completely before the valve 60 gets close to the set point.

Additionally, the filter response graph 150 (FIG. 2) provides the operator or technician with the ability to predict or view the filter response when particular settings are selected for the various user-adjustable parameters, such as lag time and ratio of lag time to lead time. The filter response graph 150 of FIG. 2 illustrates the predicted response of the lead-lag filter 20 to a unit step change before the parameters changes are applied to the lead-lag filter 20 to thereby enable the operator or technician to view a graphical representation of the predicted filter response before the dynamics of the control system are actually adjusted. Thus, there is a virtual ratio of lead-to-lag that an operator may manipulate in order to generate a predicted response of a process parameter to be controlled or tuned, and that predicted response is displayed on a display associated with the user interface 107. A similar filter response graph 155 in FIG. 3 displays the response when the lead-lag input filter 20 is turned off or disengaged.

Additionally, an operator may use the selection buttons in the area 228 of the user interface display 120 of FIG. 2 to configure the lead-lag filter 20 to be turned off or disengaged, to adjust just the lag element of the response, to adjust or select both the lag and the lead/lag ratio of the filter response, or to enable asymmetric lead/lag ratios, i.e. where there is a non-zero lag time coefficient, and the coefficients for the lead time to lag time ratio in the opening direction differs from the lead time to lag time ratio in the closing direction. When the lag time coefficient is zero, and there are non-zero, but identical lead time to lag time ratio coefficients, the lead-lag dynamics are symmetrical.

By storing collected and predicted data displayed in the plots 130, 150 in a buffer or readable memory of or operatively coupled to a computer, the plots 130, 150 may be paused, rewound, and replayed at the operator's or technician's convenience, or for future quality control, efficiency, and optimization purposes, educational purposes, regulatory compliance purposes, or other purposes.

Control mechanisms, such as the graphically depicted buttons 310, 315, 320 and slider 330 shown at the top of the display 120 of the user interface 107, may be manipulated with an appropriate computer input device, such as those listed above, to control a latency period, or delay, between the predicted response depicted in the filter response graph 150 and real world application of the settings to effect actual adjustment of the control system dynamics. In the event an operator determined that the predicted response to a particular adjustment or set of adjustments to the tuning coefficients by manipulation of one or more of the virtual interface controls 200 was an undesired result, the operator can manipulate the graphically depicted buttons 310, 315, 320 or the slider 330 to increase the latency period, and readjust the tuning coefficients until a desired result is depicted in the filter response graph 150, preventing the undesired result from ever occurring in the actual, real world control system.

Other operations, such as printing, may be performed by a technician's or operator's selection of other graphically depicted buttons 335, 340, 345, 350, 355, 360 on the display 120.

The user interface allows the stimulus for tuning the valve 60 to be applied externally (e.g., through a DCS) or "internally" with a computer software program such as ValveLink® configured to send a digital step command to the positioner. Using an external stimulus, the user manipulates the 4 mA-20 mA input signal and the valve responds accordingly. In addition, the lead-lag filter 20 may be implemented either directly in a device, such as in a valve positioner, or in a distributed control system connected to the device, e.g., in a controller. Generally speaking, the lead-lag filter 20 may be implemented as a digital control program or routine stored in a computer readable memory and executed on a processor, but may be implemented as an analog filter as well.

The user interface 107 may be provided with an option screen allowing the user to readily select an external stimulus or an internal stimulus. When the external stimulus is selected, operator adjustment of the adjustable interface controls alters at least one tuning coefficient associated with the lead-lag filter to cause modifications to the reference control signal. When the internal stimulus is selected, the adjustable interface controls are at least partially disabled, such that the disabled interface controls no longer alter tuning coefficients associated with the lead-lag filter. Instead, the tuning coefficients of the lead-lag filter are modified in response to a controller including programming adapted to cause predetermined modifications to the reference control signal.

Figure 4:
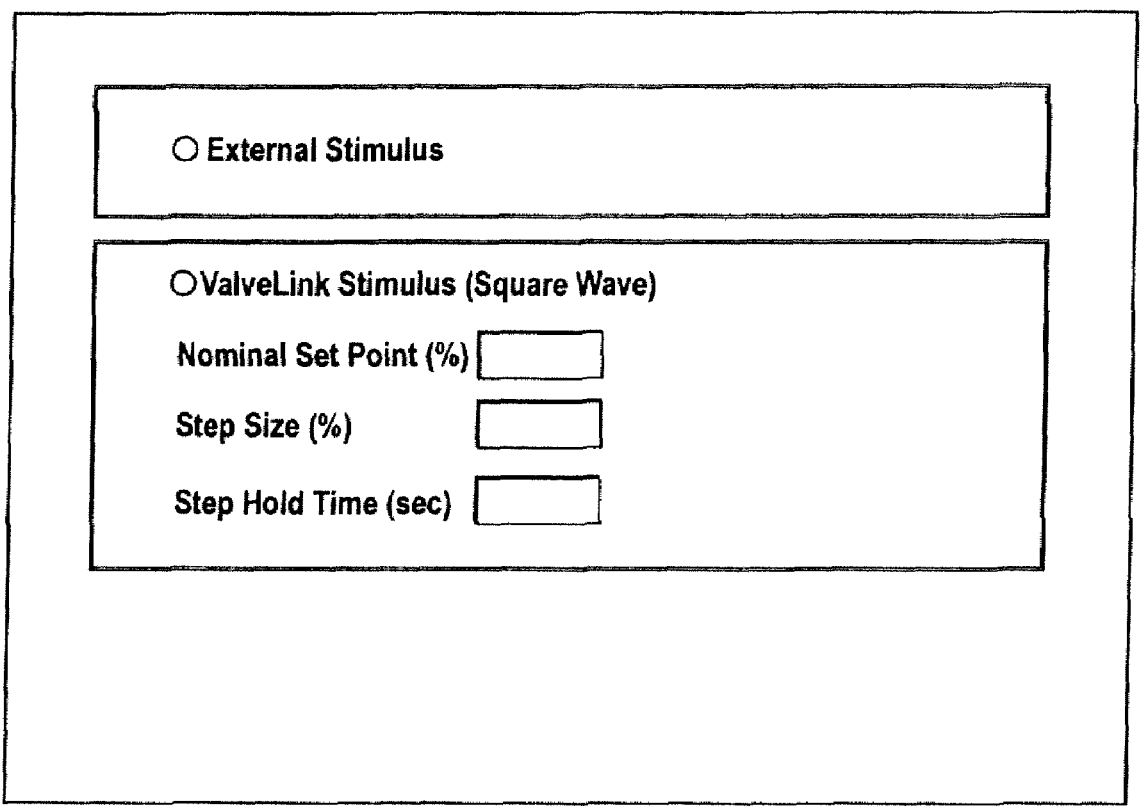
FIG. 4 is an example screen display of a menu enabling a user to select a stimulus source for the lead/lag filter of the control loop and to input values in data entry fields when such fields are enabled.

For instance, as shown in FIG. 4, a menu is provided from which a user may select either "External Stimulus" or "ValveLink Stimulus (Square Wave)", which will be understood to be an internal stimulus. Selecting the internal stimulus option enables the user to enter values for the data entry fields "Nominal Set Point (%)", "Step Size (%)", and "Step Hold Time (sec)". When "External Stimulus" is selected, these data entry fields become disabled. When the internal stimulus option is selected, the program may be configured to automatically populate the data entry fields with initial default values, such as the following:

| DATA ENTRY FIELD | DEFAULT VALUES |
|---|---|
| Nominal Set Point | 50% |
| Step Size | 15% |
| Step Hold Time | 8 seconds |

Figure 5:
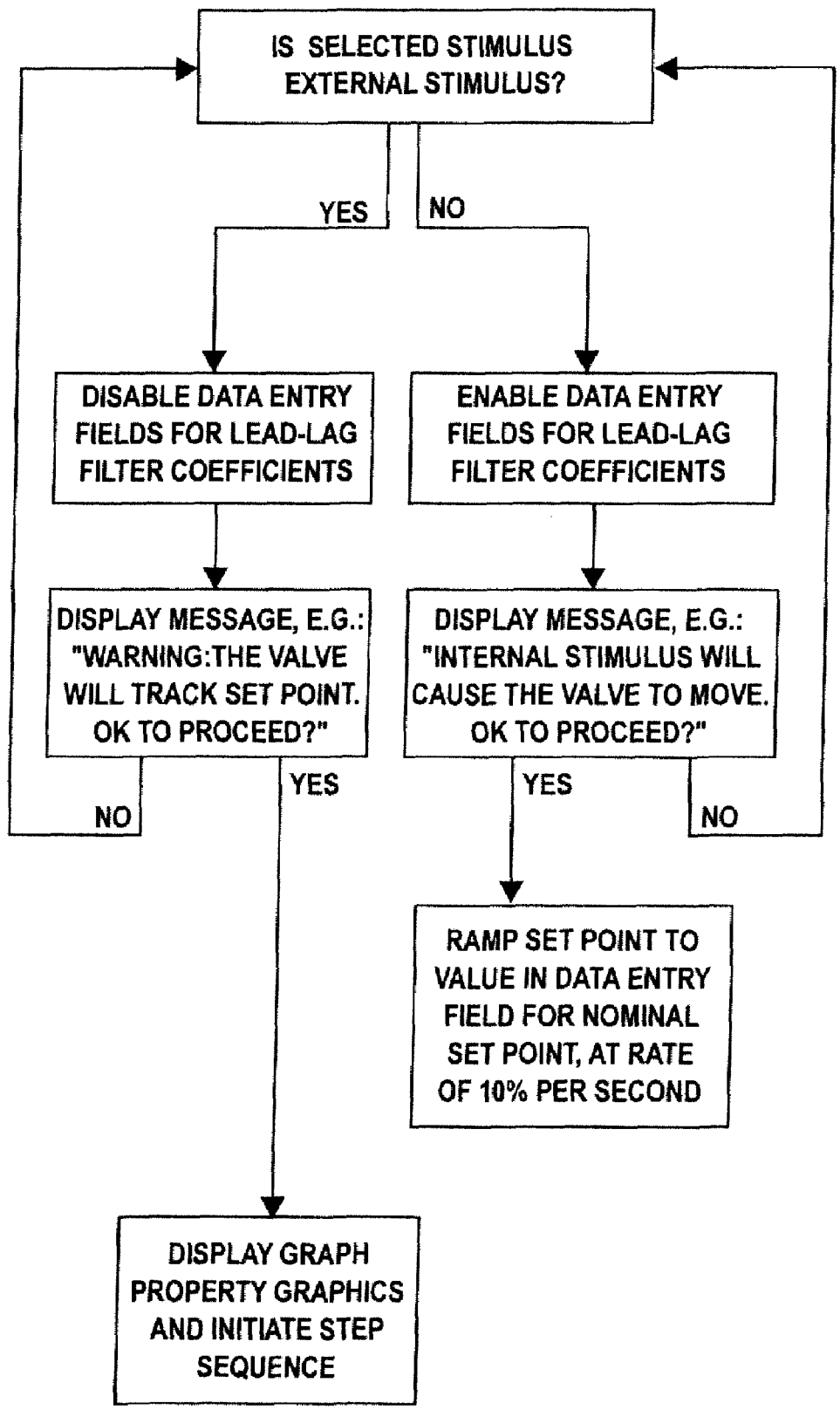
FIG. 5 is a flow chart diagramming actions performed and information displayed as a result of various inputs in a user interface of an electro-pneumatic control system.

FIG. 5 is a flow chart diagramming the results performed and displayed on the user interface, depending on whether an external stimulus or an internal stimulus is selected. Warning messages or other alerts are preferably displayed before initiating control valve operation to remind the user that, in the case of selection of an external stimulus, the valve will track the set point, and in the case of selection of an internal stimulus, the internal stimulus will cause the valve to move. If the internal stimulus option is selected, the set point value preferably ramps to the value entered for the nominal set point at 10% per second before the step sequence is initiated.

Figure 6:
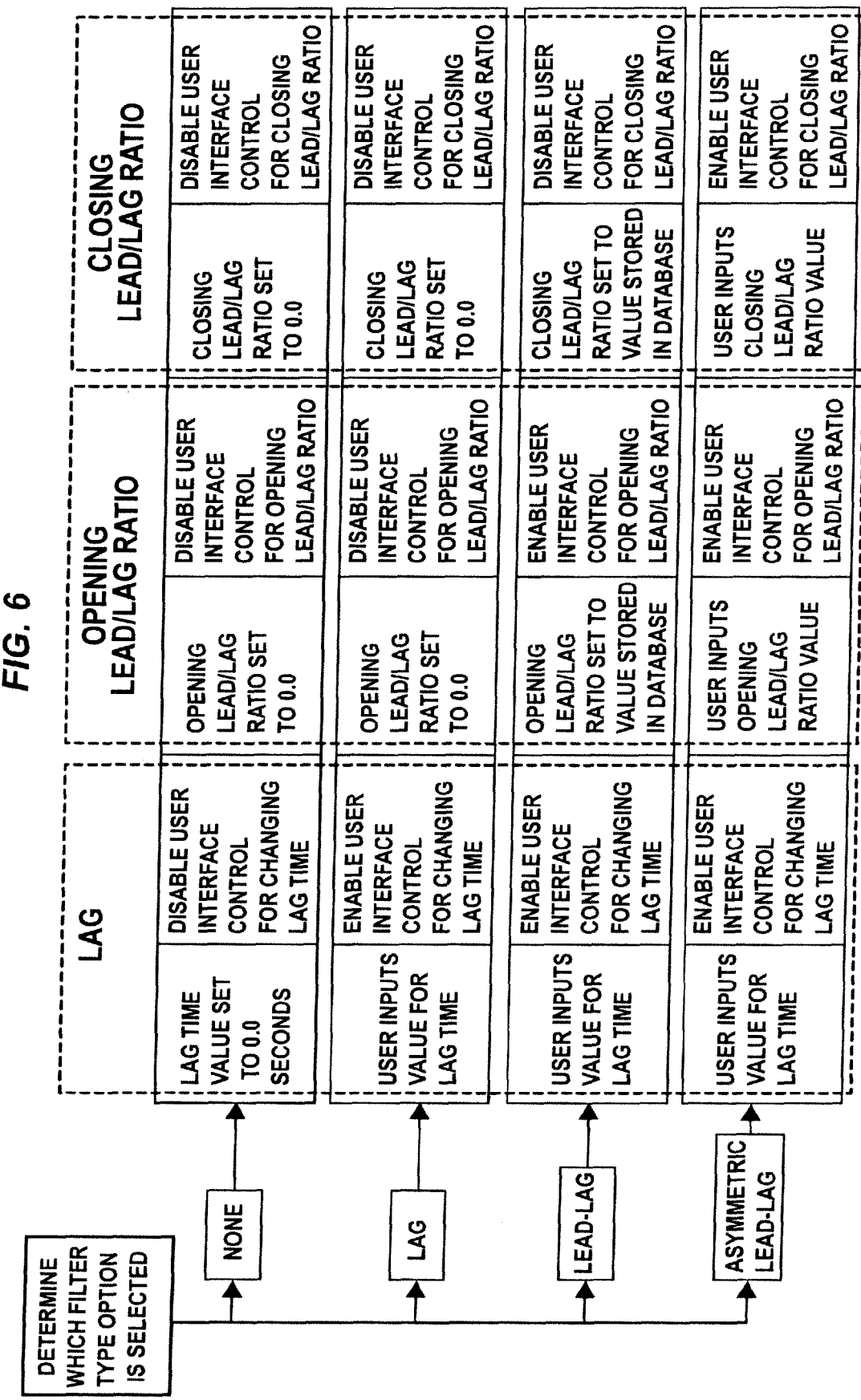
FIG. 6 is a flow chart diagramming the status of various input controls of a user interface in response to particular filter type selections.

FIG. 6 is a flow chart diagramming the status of various input controls of the user interface in response to particular filter type selections. For instance, when an asymmetric lead-lag filter type is selected, the user interface is configured to enable the user interface control for manipulating lag time. The user interface also is configured to enable the user interface control for manipulating the opening lead-lag ratio and the closing lead-lag ratio. Conversely, if a symmetric or simple lead-lag filter is selected, an initial value from a database is provided in a data entry field of the user interface for the opening lead/lag ratio, the user interface is configured to enable the user interface controls for manipulating the lag time and opening lead/lag ratio, but the user interface control for setting the closing lead/lag ratio is disabled.

Still further, as indicated above, the filter 20 may be provided with an automatic reset of the lead-lag filter dynamics to prevent the filter 20 from inadvertently activating above or below a cutoff. In particular, the lead-lag input filter 20 may, in some situations, have the undesirable capability to bounce the valve plug of the valve 60 off the seat or off of a travel stop. This is a particularly difficult problem because positioners typically have built-in travel cutoffs that fully saturate the I/P transducer 80 when set point approaches 0% or 100%. For a Fisher DVC6000 digital valve controller, the problem associated with the use of lead-lag filters at the high or low range of the valve is avoided by establishing travel cutoffs using default values of 0.5% and 99.5%, meaning that if the reference signal or set point falls below 0.5% or exceeds 99.5%, the servo controller is bypassed and the I/P transducer 80 is either saturated at full supply or vented to the atmosphere, depending on the required saturation state. As a result, during normal throttling operation the lead-lag input filter 20 should not trip a cutoff.

A pseudo computer programming code provided below demonstrates an example computer program code implementation that may be used to assure that a controller associated with or that implements the lead-lag input filter 20 prevents cutoffs from being tripped. In this case, the lead-lag input filter 20 is bypassed and the dynamics are reset if the output of the filter 20 exceeds a predefined limit near the cutoff value, such as at 0.5% or 99.5%, although other values can be used as well.

```
//-----------------------------------------------------------------------
// Begin lead-lag filter
//-----------------------------------------------------------------------
//--- Prefilter stage ---
if((r >= filter_limit_high) ||(r <= filter_limit_low) || (lag_time == 0.0))
{
    x = r; // bypass filter when in or near cutoffs
}
else // --- Filter stage ---
{
    x = a * (r_old - x_old) + x_old + b * (r - r_old);
    // check filter output to make sure we do not bump into cutoffs
    if(x >= filter_limit_high)
        x = filter_limit_high;
    else if (x<= filter_limit_low)
```

-continued

```
    x = filter_limit_low;
}
// --- Post filter stage ---
x_old = x; // update old values
r_old = r;
//------------------------------------------------------------------
// End lead-lag filter
//------------------------------------------------------------------
```

In one embodiment, the lead-lag input filter 20 may be implemented with four states, or stages, of execution including a prefilter stage, a filter stage, a post-filter stage, and an initial condition stage. In the prefilter stage, the filter 20 checks to determine if the reference signal 10 has exceeded a predefined upper limit, has dropped below a predefined lower limit, or if the filter 20 has been turned off altogether. When the reference signal 10 exceeds the predefined upper limit or drops below the predefined lower limit (or the filter 20 is turned off or disengaged via the user interface 107), the lead-lag input filter 20 bypasses processing of the reference signal and, instead, provides the reference signal 10 directly to the input 30 of the servo-loop. As indicated above, the predefined upper and lower limits are preferably set so that output of the lead-lag input filter 20 will not trip a cutoff or hit a hard stop in the actuator.

The following pseudo computer programming code demonstrates one manner in which a controller associated with the lead-lag input filter 20 may be programmed so as to set the upper and lower filter limits to desirable threshold levels:

Filter_limit_high=min((*ivp*_cutoff_high−high_cutoff_deadband), (100%−high_cutoff_deadband))

Filter_limit_low=max((*ivp*_cutoff_low+low_cutoff_deadband), (0%+low_cutoff_deadband))

These limits may be calculated in firmware and are calculated every time the input characteristic, lower travel cutoff, or upper travel cutoff values are changed. Moreover, because the cutoff processing algorithm is downstream of the characterizer, these limits are passed through an inverse characteristic (with x- and y-data vectors reversed) so that the characterized limits are below the cutoff thresholds.

In the filter stage, the lead-lag input filter 20 operates as a standard discrete time filter. Generally speaking, the lead-lag input filter 20 may be represented as having two coefficients, "a" and "b." Coefficient "a" is the coefficient for the lag contribution and coefficient "b" is the coefficient for the ratio of the lead time to lag time, which may be expressed formulaically as: $\tau_{lead}/\tau_{lag}$. To prevent the lead-lag input filter 20 from activating a cutoff or hitting a hard travel stop, the output of the filter 20 is preferably reset to the same upper and lower values used in the prefilter stage. During the filter stage or state, the filter 20 applies the filter coefficients (ratio) to the reference signal in any known or desired manner to create the filtered input signal for the servo-loop.

During the post-filter stage, the previous values used in the filter calculations are updated based on new inputs from the user interface or from the servo-loop. Finally, during the initial conditions stage, which occurs for example when an instrument is started up, the initial conditions of the lead-lag input filter 20 are set to the present input reference value. Of course, in order to provide inverse dynamics to nonlinearities in the pneumatics, filter coefficients may be separately adjusted for the opening direction and the closing direction of a control valve 60.

In a preferred embodiment, the lead-lag input filter's result, i.e. the effect of the lead-lag input filter 20 on the set point or the valve input signal, is given by the formula:

$$(\tau_1 s+1)/(\tau_2 2s+1)$$

By adjusting the values of $\tau_1$ and $\tau_2$, the ratio is changed, effecting pure lag, pure lead, or some combination of lead and lag. When applied to a control valve, the resulting ratio correlates to the amount of overshoot that the lead-lag filter will provide. Thus, in different valve performance scenarios, the operator may use the user interface 107 to adjust the ratio to achieve desired alterations. For instance, if it is desired for the lead-lag input filter 20 to produce pure lag, then $\tau_1 s$ is set to zero, producing a result of $1/(\tau_2 s+1)$. In a control loop, when pure lag is generated by the lead-lag input filter 20, error is driven towards zero. As a result, the position of the control valve stem with which the lead-lag filter 20 is employed, or other process variable being controlled, will creep to the travel set point 50.

If it is desired for the lead-lag input filter 20 to produce pure lead, then $\tau_2 s$ is set to zero, producing a result of $(\tau_1 s+1)/1$. In a control loop, this provides anticipatory control, by correcting for error prior to occurrence of such error. When plotted, the operator of the user interface 107 would see positive phase with respect to the controlled element.

So long as the lead-lag ratio is greater than 1.0, the initial lead response will dominate. If the lead-lag ratio is 2, there is an initial lead response of 2.0, as a result of which any correction in the position of the control valve stem or shaft is substantially reduced, prior to error propagating through the control circuit, and will then gradually move the control valve stem position, or other process variable being controlled, to the travel set point 50. If the lead-lag ratio is less than 1.0, then the lag correction will dominate.

By recognizing the change in performance in various valve performance scenarios resulting from various possible lead-lag ratios, operators may become easily adept at fine tuning process parameters and correcting for errors, and may easily optimize control valve performance.

It will be recognized that additional components may advantageously be provided that benefit from the use of a lead-lag filter 20. For example, feedforward components may be provided which are adapted to respond to data including the reference signal 10, velocity of the reference signal 10, and acceleration of the reference signal 10.

Figure 7:
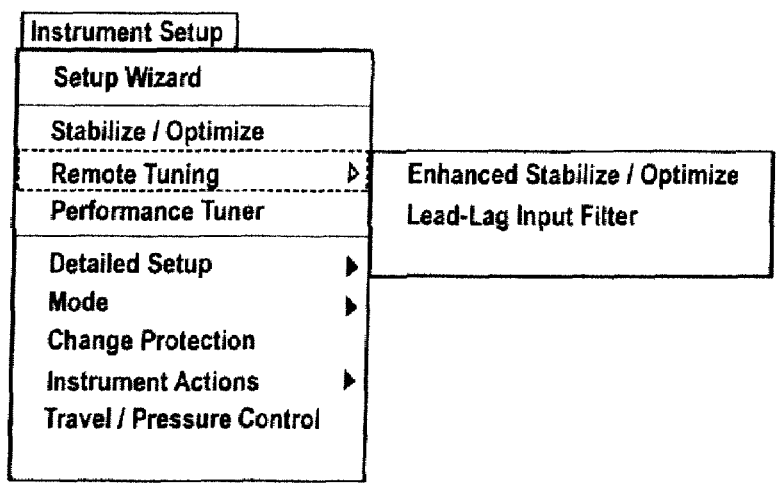
FIG. 7 is an example screen display of a menu enabling a user to select among various instrument control settings, including a setting "Remote Tuning".

The display 120 of the user interface 107 is preferably accessed through one or more menu screens, such as a pull-down menu screen captioned "Instrument Setup" as shown in FIG. 7. The menu screen(s) preferably provide adequate indicia to inform the user that the control valve loop may be remotely tuned. For instance, a menu option in FIG. 5 reads "Remote Tuning". When selected, the user may select "Enhanced Stabilize/Optimize Lead-Lag Input Filter".

The lead-lag input filter 20 may be implemented in any number of different types of servo-loops. Thus, while the lead-lag input filter 20 is illustrated in FIG. 1 as being used in one type of electro-pneumatic control system comprising a high-gain, closed-loop servo controller used to set stem or shaft position on control valves, it could be used in other control systems or control loops as well. For example, another application in which a lead-lag filter associated with a set point is effective is in combination with ball valves where shaft windup between the actuator and the plug introduces dead band in flow control. Shaft windup may be overcome by briefly over driving the actuator and allowing the ball to move to the desired location. Because this is an open-loop technique, the response is not perfect, but a considerably better response is obtained than without a lead-lag filter.

Still further, there are various techniques available to improve performance by driving the servo to set point faster than what would normally be achieved by closed loop compensation alone, without changing closed loop dynamics. Augmenting the feedback controller with a lead-lag filter on the set point is one such technique, while other techniques involve augmenting the controller with set point velocity feedforward elements. The lead-lag filter could be used in these situations as well.

The technique in which a feedback controller is augmented with a lead-lag input filter is particularly useful in applications in which accessories for increasing actuator stroke speed, such as volume boosters and QEVs, are used. In order to compensate for slow dynamics at low amplitude changes, a lead-lag filter may be used to over drive the set point for a brief amount of time, so as to engage volume boosters even at lower amplitudes, such as amplitudes at which conventional volume booster arrangements would not be effectively activated due to low dead bands.

While the lead-lag filter 20 may be implemented in a desired manner, including in software and hardware or firmware, when implemented in software, the software routines discussed herein may be stored in any computer readable memory such as on a magnetic disk, a laser disk, or other storage medium, in a RAM or ROM of a computer or processor, such as an application specific integrated circuit (ASIC), a standard multi-purpose CPU or other hard-wired device, etc. Likewise, the software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

While certain embodiments have been described herein, claims to the disclosed invention are not intended to be limited to these specific embodiments.

We claim:

1. A method for controlling a process parameter of a control loop comprising:
    providing a reference control signal at an input to a control loop;
    providing a lead-lag filter in communication with the reference control signal prior to amplification of the reference control signal;
    providing a user interface in operable communication with the lead-lag filter, said user interface facilitating remote manipulation of a ratio of lead-to-lag produced by the lead-lag filter; and
    operating the user interface to remotely manipulate the ratio of lead-to-lag of the lead-lag filter to produce an alteration in the process parameter to be controlled.

2. The method of claim 1, wherein operating the user interface includes adjusting at least one tuning coefficient associated with the lead-lag filter by manipulating at least one virtual interface control provided on a display associated with the user interface.

3. The method of claim 2, and displaying data associated with the process parameter to be controlled.

4. The method of claim 3, wherein the data is displayed on the display associated with the user interface.

5. The method of claim 1, and manipulating a virtual ratio of lead-to-lag to generate a predicted response of the process parameter to be controlled, and displaying the predicted response on a display associated with the user interface.

6. The method of claim 1, wherein the reference control signal is a 4-20 mA control signal.

7. A system for tuning a process parameter of a control loop comprising:
    a lead-lag input filter in communication with an input to the control loop;
    a controller applying an unamplified reference control signal to an input of the lead-lag input filter;
    a user interface facilitating remote manipulation of the lead-to-lag ratio in operable communication with the lead-lag filter, said user interface including at least one adjustable interface control, wherein adjustment of each of said at least one adjustable interface controls alters at least one tuning coefficient associated with the lead-lag filter.

8. The system of claim 7, wherein the user interface further includes a display for monitoring a process parameter affected by alteration of the at least one tuning coefficient.

9. The system of claim 8, wherein the control loop includes at least one feedback signal that varies with changes in the process parameter.

10. The system of claim 8, wherein the user interface includes a display on which variations in the at least one feedback signal are graphically displayed.

11. The system of claim 7, wherein the user interface further includes a display for a monitoring a predicted response of the process parameter in response to adjustments of each of the at least one adjustable interface controls.

12. The system of claim 11, wherein the user interface is provided with at least one control mechanism to control a latency period between the predicted response of the process parameter to adjustments of each of the at least one adjustable interface controls, and application of the adjustments of each of the at least one adjustable interface controls to the lead-lag filter to effect an actual response of the process parameter.

13. The system of claim 7, wherein said user interface is provided in a location remote from the lead-lag input filter.

14. A system for tuning the response of a control valve and facilitating remote manipulation of the lead-to-lag ratio comprising:
    a control loop including a valve controller, a current-to-pressure transducer, a control valve, and a valve actuator in operable communication with a valve plug of the control valve;
    a lead-lag filter in communication with an input to the control loop;
    a process controller supplying an unamplified reference control signal to an input of the lead-lag filter;
    and a user interface in operable communication with the lead-tag filter, said user interface including at least one adjustable interface control, wherein adjustment of each of said at least one adjustable interface controls alters at least one tuning coefficient associated with the lead-lag filter.

15. The system of claim 14, wherein the user interface is located at a remote location from the lead-lag filter.

16. The system of claim 14, wherein the user interface communicates with the lead-lag filter through at least one of a group of telephone lines, satellite transmission, coaxial cable, Ethernet, fiber optic cable, and the Internet.

17. The system of claim 14, wherein the user interface further includes a display for a monitoring a predicted response of a position of the valve plug of the control valve in response to adjustments of each of the at least one adjustable interface controls.

18. The system of claim 17, wherein the user interface is provided with at least one control mechanism to control a latency period between the predicted response of the position of the valve plug of the control valve to adjustments of each of the at least one adjustable interface controls, and application of the adjustments of each of the at least one adjustable interface controls to the lead-lag filter to effect an actual response of the position of the valve plug of the control valve.

19. The system of claim 14, wherein the lead-lag input filter is in communication with a controller, said controller including programming adapted to cause the lead-lag input filter to curtail movement of a valve stem of the control valve operatively coupled to the valve plug as the valve plug approaches at least one of a valve seat and a travel stop of the control valve.

20. A method for optimally tuning adjustment of a parameter of a control loop comprising:

providing a lead-lag input filter in communication with an input of a control loop;

supplying an unamplified reference control signal to an input of the lead-lag input filter;

providing at least one of a user interface and a controller in operable communication with the lead-lag input filter and facilitating remote manipulation of the lead-to-tag ratio; and operating the user interface or controller to signal the lead-lag input filter to modify the reference control signal prior to application of the control signal to the input of the control loop.

21. The method of claim 20, and providing both the user interface and the controller in operable communication with the lead-lag input filter, and selecting among the user interface and the controller.

22. The method of claim 21, wherein upon selecting the controller, at least partially disabling the user interface.

* * * * *